US012594150B2

(12) United States Patent
Kim et al.

(10) Patent No.: US 12,594,150 B2
(45) Date of Patent: Apr. 7, 2026

(54) CLIP FOR COUPLING TO SCAN BODY FOR ACCURATE INTRAORAL SCANNING

(71) Applicant: DENTCA, Inc., Torrance, CA (US)

(72) Inventors: Tae Hyung Kim, La Canada, CA (US); Sun Kwon, Fullerton, CA (US)

(73) Assignee: DENTCA, INC., Torrance, CA (US)

( * ) Notice: Subject to any disclaimer, the term of this patent is extended or adjusted under 35 U.S.C. 154(b) by 409 days.

(21) Appl. No.: 18/297,386

(22) Filed: Apr. 7, 2023

(65) Prior Publication Data

US 2023/0320822 A1     Oct. 12, 2023

Related U.S. Application Data

(60) Provisional application No. 63/329,799, filed on Apr. 11, 2022.

(51) Int. Cl.
*A61C 8/00*     (2006.01)
*A61C 9/00*     (2006.01)
(52) U.S. Cl.
CPC .......... *A61C 8/0089* (2013.01); *A61C 9/0053* (2013.01)

(58) Field of Classification Search
USPC ........................................................ 382/128
See application file for complete search history.

(56) References Cited

U.S. PATENT DOCUMENTS

| | | | | |
|---|---|---|---|---|
| 10,485,632 | B1 * | 11/2019 | Al-Ekrish | A61B 90/39 |
| 2019/0290365 | A1 * | 9/2019 | Gao | A61B 34/20 |
| 2023/0363854 | A1 * | 11/2023 | Ciriello | A61C 5/80 |

* cited by examiner

*Primary Examiner* — Jacky X Zheng
(74) *Attorney, Agent, or Firm* — LEE, HONG, DEGERMAN, KANG & WAIMEY

(57)     ABSTRACT

According to at least one embodiment, a method of performing intraoral scanning includes: positioning a first scan body at a location of a first implant; positioning a second scan body at a location of a second implant; coupling a first clip to the first scan body; and coupling a second clip to the second scan body. The coupled first clip extends from the positioned first scan body towards the location of the second implant, and the coupled second clip extends from the positioned second scan body towards the location of the first implant.

8 Claims, 7 Drawing Sheets

204-1

204-3

306
Can't well recognize mutual
positions and distance.

<u>700</u>

702 — Position a first scan body at a location of a first implant

704 — Position a second scan body at a location of a second implant

706 — Couple a first clip to the first scan body

708 — Couple a second clip to the second scan body

710 — Perform the intraoral scanning by capturing a plurality of frames

CLIP FOR COUPLING TO SCAN BODY FOR ACCURATE INTRAORAL SCANNING

CROSS-REFERENCE TO RELATED APPLICATION(S)

Pursuant to 35 U.S.C. § 119(e), this application claims the benefit of U.S. Provisional Patent Application No. 63/329,799, filed on Apr. 11, 2022, the contents of which are all hereby incorporated by reference herein in its entirety.

BACKGROUND

A dental implant is a medical device surgically implanted into the jaw to restore a person's ability to chew or their appearance. The dental implant provides support for a dental prosthesis (e.g., a crown, bridge, or denture).

Dental implants may be utilized in a prosthodontics procedure known as All-on-4 (or All-on-Four or All-in-Four). This procedure is typically performed on edentulous patients (patients having few or no teeth), or patients having badly broken down, decayed or otherwise compromised teeth. In the All-on-4 procedure, teeth are supported on four dental implants. For example, four implants may collectively support a fixed prosthesis (e.g., superstructure) having 10 to 14 teeth.

Designing an implant-supported superstructure (e.g., denture, crown) may involve an initial process of obtaining dental impressions of the upper and/or lower jaw of a patient. Such impressions may be obtained using an intra-oral scanner. An intra-oral scanner is a handheld device that is used to create a digital impression of an oral area. Light emitted from the scanner is projected onto scan objects. A model (e.g., three-dimensional model) that is processed by scanning software may then be displayed at a display in real-time. The model may reflect details of hard and soft tissues located in the oral area based on images captured by the intra-oral scanner.

SUMMARY

Using an intra-oral scanner may not provide optimal results. For example, by itself, the intra-oral scanner may be unable to accurately capture aspects (e.g., depth, width, angle, etc.) of an object such as a female screw that is embedded at the location of an implant.

To improve accuracy in such situations, scan bodies may be utilized. For example, a scan body (or scan abutment) may be positioned to be coupled with the female screw at an implant location. In this regard, the scan body may be inserted into or otherwise attached to the female screw. Once one or more scan bodies have been positioned in such a manner, an intra-oral scanner is then used to scan the oral area of the patient and thereby create a digital impression of the oral area.

The scan bodies are recognized as "landmarks" by scanning software (e.g., one or more design software tools). Accordingly, the scanning software produces a model that is displayed at a display. The model shows the embedded (and otherwise invisible) female screws. As such, aspects of the embedded female screws (e.g., depth, width, angle, etc.) may be captured. A superstructure (e.g., denture, crown) to be supported by the implants may then be designed accordingly.

In edentulous patients, the lack of teeth may present a sizable area (e.g., a wide area) in which a clear landmark is lacking. (See, e.g., FIG. 2.) Because of the lack of a landmark that is recognizable by scanning software, intra-oral scanning may produce inaccurate results. For example, a distorted image of the patient's mouth may be produced.

Aspects of the present disclosure are directed toward addressing positional relationships between scan bodies, e.g., to better facilitate the design of implant-supported dentures. For example, according to one or more embodiments, the effective distance between adjacent landmarks (e.g., adjacent scan bodies) is reduced. By way of example, clips may be utilized. According to particular embodiments, the distance between adjacent landmarks may be reduced as much as possible.

According to at least one embodiment, a method of performing intraoral scanning includes: positioning a first scan body at a location of a first implant; positioning a second scan body at a location of a second implant; coupling a first clip to the first scan body; and coupling a second clip to the second scan body. The coupled first clip extends from the positioned first scan body towards the location of the second implant, and the coupled second clip extends from the positioned second scan body towards the location of the first implant.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, as well as procedural, changes may be made without departing from the scope of the present invention. Wherever possible, the same reference numbers will be used throughout the drawings to refer to the same or similar parts.

As described earlier, according to one or more embodiments, the effective distance between adjacent landmarks (e.g., adjacent scan bodies) is reduced. For example, clips may be utilized. To shorten the effective distance between the scan bodies, the clips are coupled to the scan bodies prior to performing intra-oral scanning. In this manner, the scan bodies effectively become closer to each other, to better enable the intra-oral scanning to produce a more accurate image of a patient's mouth.

Figure 1:
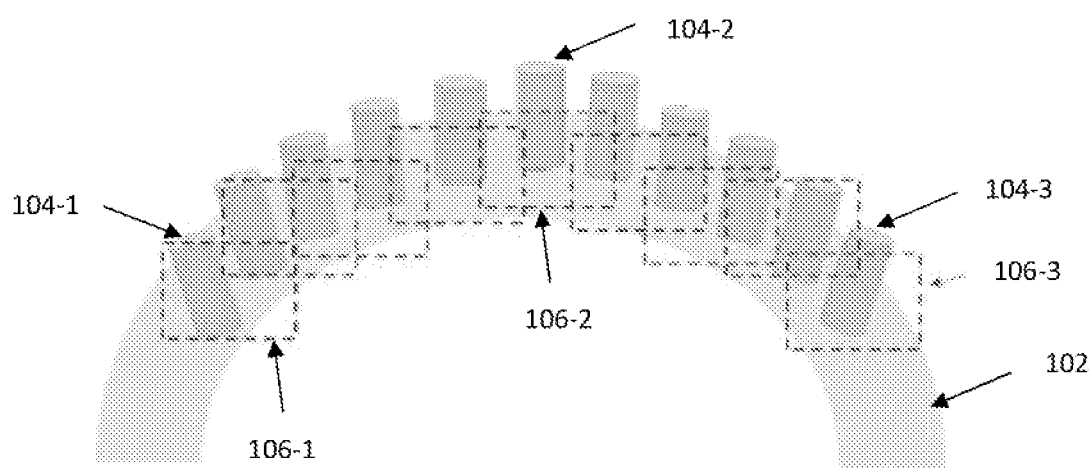
FIG. 1 illustrates a presence of recognizable landmarks in a jaw of a patient.

An intra-oral scanner recognizes the geometry in the patient's mouth by capturing multiple picture-frames and combining them. With reference to FIG. 1, multiple landmarks (including landmarks 104-1, 104-2, 104-3) are present at a jaw 102 of a patient. For purposes of description, these landmarks may be individual teeth. An intra-oral scanner is waved along the jaw 102 to capture individual picture frames, including picture frames 106-1, 106-2, 106-3. In conjunction with scanning software, the intra-oral scanner recognizes the geometry in the patient's mouth by combining multiple picture-frames.

As illustrated in FIG. 1, the number of landmarks in the patient's mouth is sufficiently high such that one or more landmarks are captured (at least partially) in each picture frame. For example, two adjacent landmarks are captured at least partially in picture frame 106-1. As another example, three adjacent landmarks are captured at least partially in picture frame 106-2. As yet another example, two adjacent landmarks are captured at least partially in picture frame 106-3. Accordingly, the intra-oral scanner can more readily detect the distance between adjacent landmarks and thereby recognize and develop an accurate geometry of the patient's mouth.

Figure 2:
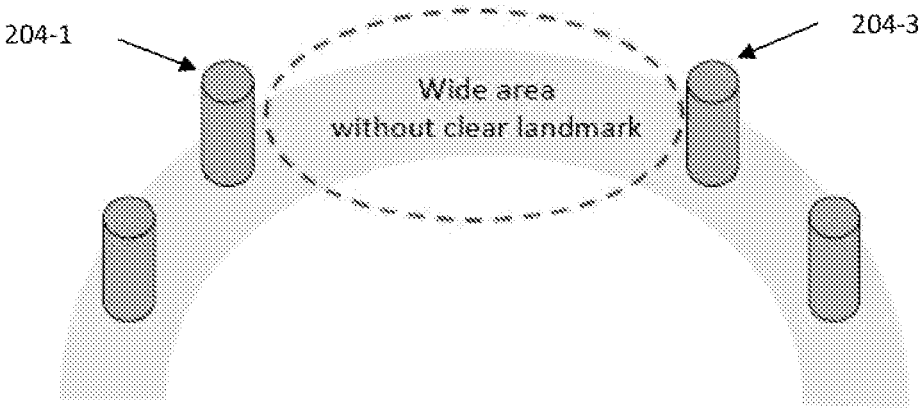
FIG. 2 illustrates a lack of recognizable landmarks in a jaw of an edentulous patient.

FIG. 2 illustrates a lack of recognizable landmarks in a jaw of an edentulous patient. Relative to the situation illustrated in FIG. 1, the number of recognizable landmarks is significantly smaller. For purposes of description, the landmarks illustrated in FIG. 2 may be individual scan bodies.

The lack of teeth in a patient may present a sizable area (e.g., a wide area) in which a clear landmark is lacking. As illustrated in FIG. 2, such a sizable area is located between landmarks 204-1 and 204-3. An intra-oral scanner is unable to accurately recognize geometry of such areas that lack recognizable landmarks. For example, the intra-oral scanner would be unable to recognize the distance between the landmarks 204-1 and 204-3. This is because the distance between the landmarks 204-1 and 204-3 is sufficiently large such that one or more picture frames (that are captured during intra-oral scanning) fail to capture at least a portion of one or more landmarks.

Figure 3:
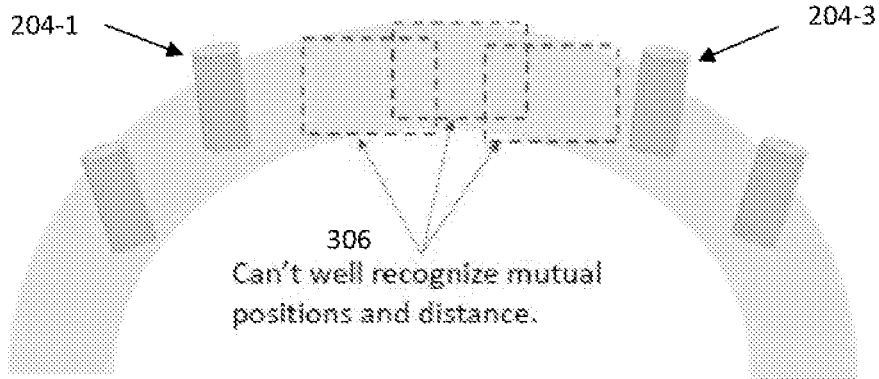
FIG. 3 illustrates examples of individual picture frames that are captured of the jaw of FIG. 2.

As illustrated in FIG. 3, each of picture frames 306 fails to capture at least a portion of any landmark, including the landmarks 204-1 and 204-3. Accordingly, the intra-oral scanner cannot detect the distance between the landmarks 204-1 and 204-3. As described earlier, in the mouth of an edentulous patient, the landmarks may be individual scan bodies. According to at least one embodiment, to assist the intra-oral scanner in detecting the distance between the landmarks 204-1 and 204-3, a recognizable landmark is provided between the landmarks 204-1 and 204-3. One or more additional implants that are positioned between the landmarks 204-1 and 204-3 would serve this purpose. However, this may be not practical or realistic.

Figure 4:
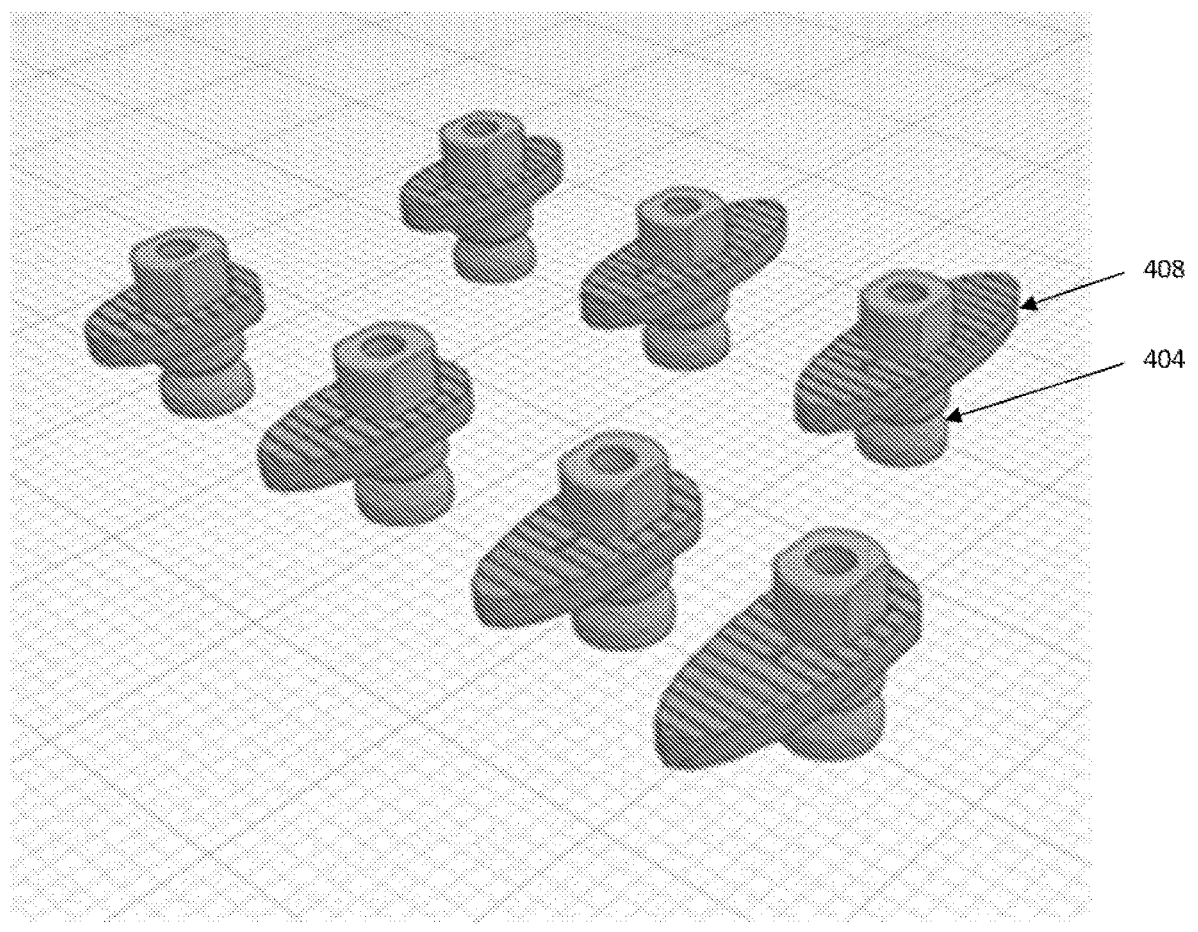
FIG. 4 illustrates examples of clips coupled to scan bodies according to at least one embodiment.
Figure 5A:
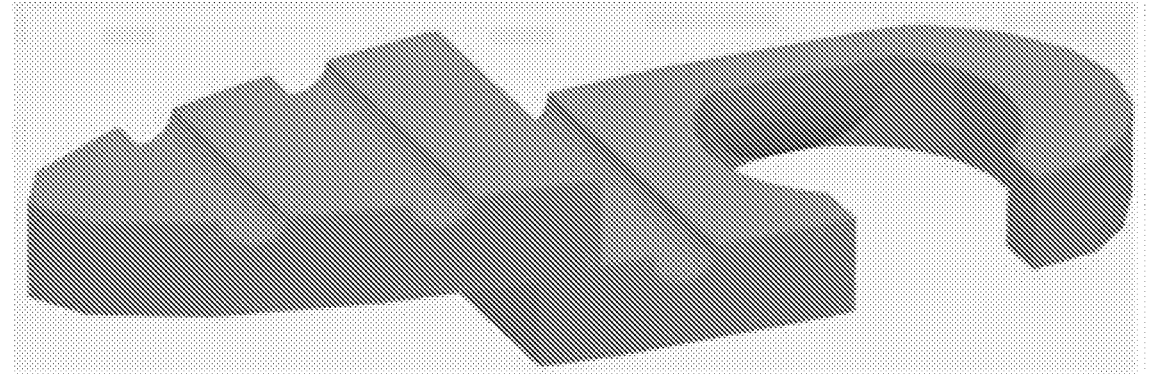
FIGS. 5A, 5B, 5C, 5D and 5E illustrate perspective views of clips according to one or more embodiments.
Figure 5B:
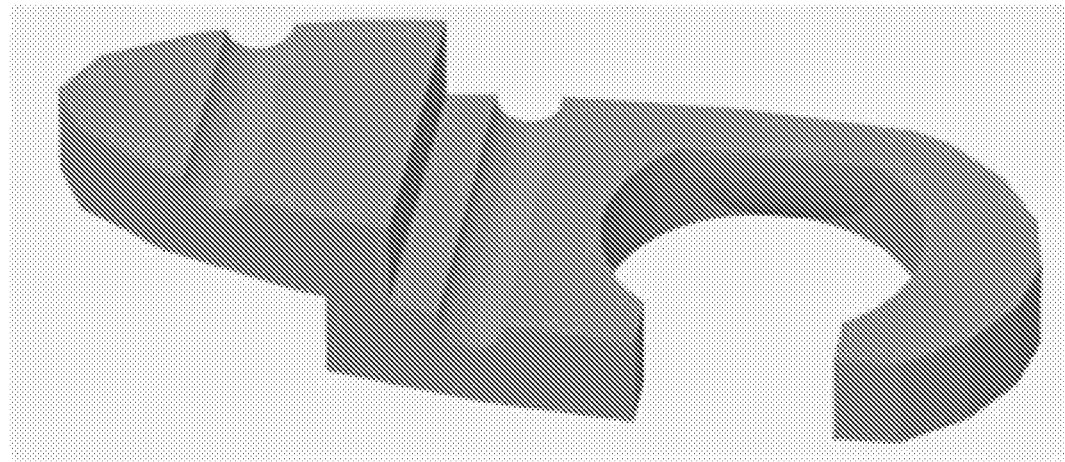
Figure 5C:
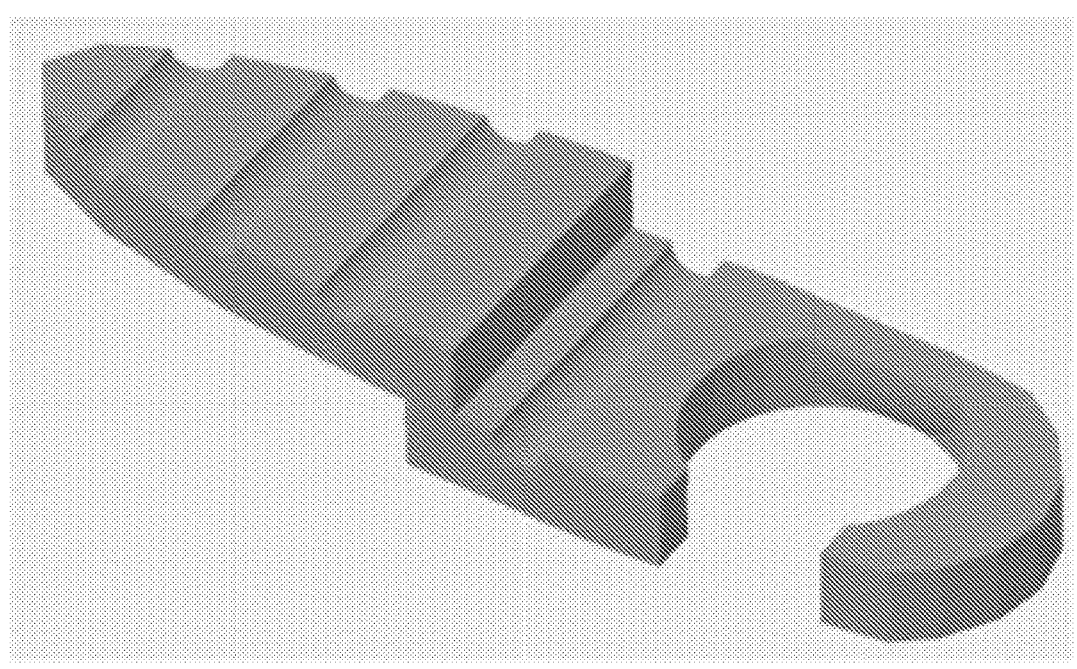
Figure 5D:
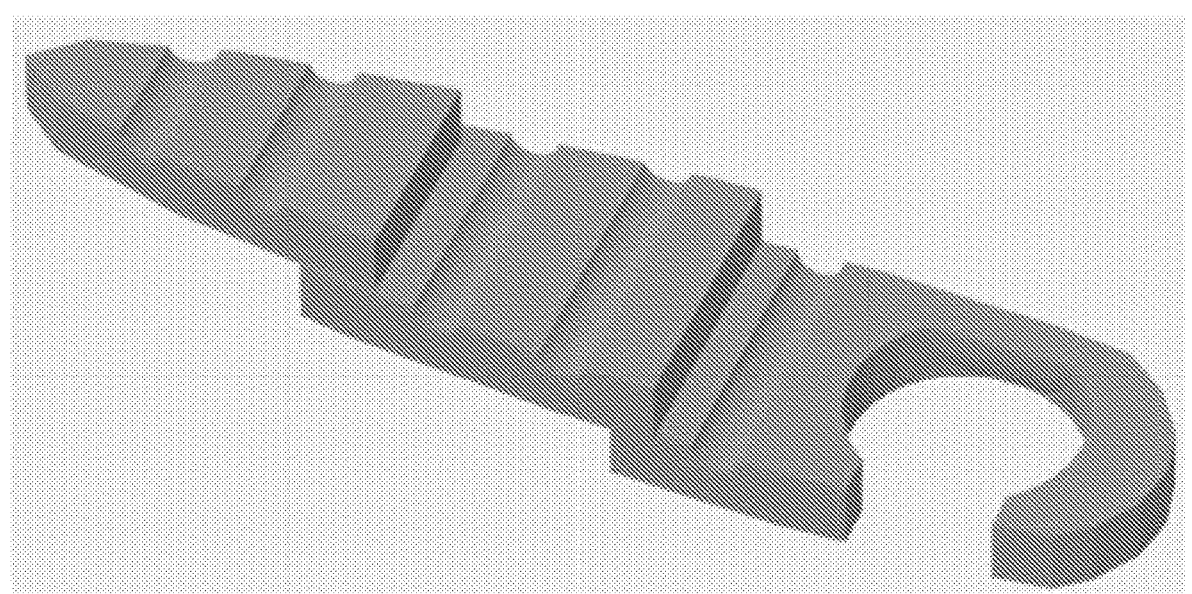
Figure 5E:
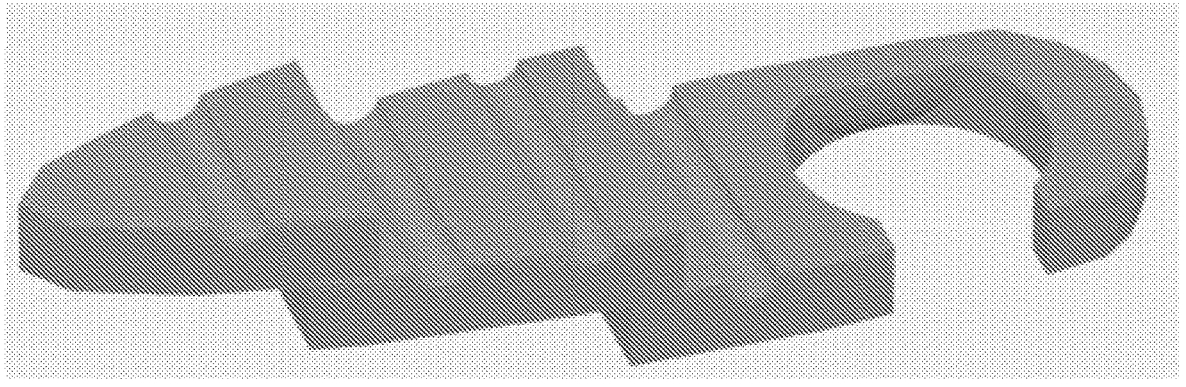

According to at least one embodiment, one or more clips are utilized. For example, a clip may be coupled to the landmark (e.g., scan body) 204-1 that is positioned at a location of a first implant. In addition, a clip may be coupled to the landmark (e.g., scan body) 204-3 that is positioned at a location of a second implant. Each of the clips is configured to be capable of being coupled to (or with) the corresponding scan body. Examples of clips coupled to scan bodies are illustrated in FIG. 4. As illustrated in FIG. 4, a clip 408 is coupled to a scan body 404.

FIGS. 5A, 5B, 5C, 5D, 5E illustrate perspective views of clips according to one or more embodiments. As illustrated in these figures, the clip may have an elliptical surface rather than a rectangular surface. As also illustrated, the clip may have a textured surface rather than an entirely smooth (or entirely level) surface. For example, the clip may have a surface on which one or more grooves are located. As yet another example, the clip may have a first surface and a second surface elevated that is relative to the first surface. Such features may, alone or in combination, assist the intra-oral scanner in recognize the geometry of a patient's mouth more readily.

Figure 6:
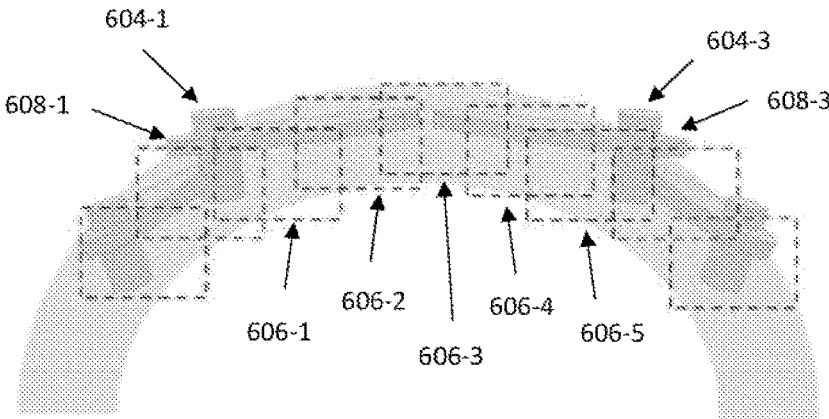
FIG. 6 illustrates examples of individual picture frames that are captured of a jaw in which clips are coupled to scan bodies according to at least one embodiment.

FIG. 6 illustrates examples of individual picture frames that are captured of a jaw in which clips are coupled to scan bodies according to at least one embodiment. With reference to FIG. 6, a clip 608-1 is coupled to a landmark (e.g., scan body) 604-1 that is positioned at a location of a first implant. In addition, a clip 608-3 is coupled to a landmark (e.g., scan body) 604-3 that is positioned at a location of a second implant. The coupled clip 608-1 extends from the scan body 604-1 towards the location of the second implant, and the coupled clip 608-3 extends from the scan body 604-3 towards the location of the first implant.

Regarding the area that is located between the scan bodies 604-1 and 604-3, the clip 608-1 and/or the clip 608-3 may serve as a recognizable landmark during intra-oral scanning. As illustrated in FIG. 6, each of picture frames 606-1, 606-2, 606-3, 606-4, 606-5 capture at least a portion of a recognizable landmark.

For example, the scan body 604-1 and the clip 608-1 are captured at least partially in picture frame 606-1. As another example, the clip 608-1 is captured at least partially in picture frame 606-2. As yet another example, the clips 608-1 and 608-3 are captured at least partially in picture frame 606-3.

According to one embodiment, the picture frame 606-3 captures at most a portion of the clip 608-1 and at most a portion of the clip 608-3.

As a further example, the clip 608-3 is captured at least partially in picture frame 606-4. As yet a further example, the clip 608-3 and the scan body 604-3 are captured at least partially in picture frame 606-5.

By coupling the clips 608-1 and 608-3 to the scan bodies 604-1 and 604-3, respectively, the effective distance between the adjacent scan bodies 604-1 and 604-3 is reduced (or shortened). As has been described, each picture frame that is taken of the area located between the scan bodies 604-1 and 604-3 captures at least a portion of a recognizable landmark. For example, each of picture frames 606-1, 606-2, 606-3, 606-4, 606-5 captures at least a portion of the scan body 604-1, at least a portion of the clip 608-1, at least a portion of the clip 608-3, and/or at least a portion of the scan body 604-3.

Accordingly, the intra-oral scanner can more readily detect the distance between the adjacent scan bodies 604-1 and 604-3 and thereby recognize and develop an accurate geometry of the mouth of a patient (e.g., the mouth of an edentulous patient). A superstructure (e.g., denture, crown) to be supported by implants that are in the patient's mouth may then be designed accordingly.

Figure 7:
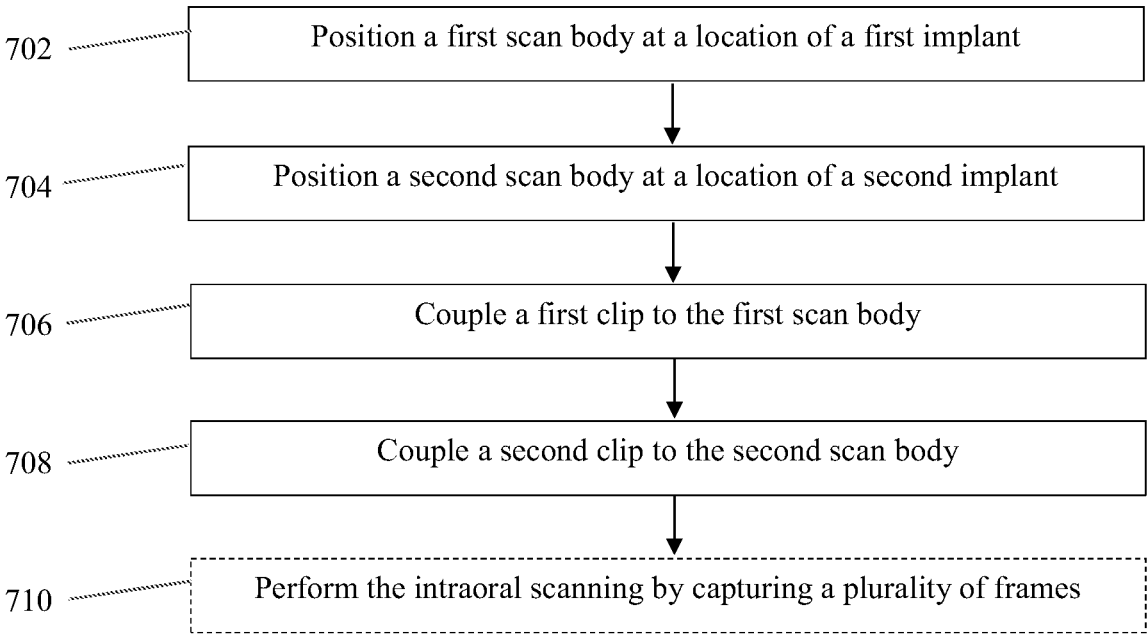
FIG. 7 illustrates a flowchart of a method of performing intraoral scanning according to at least one embodiment.

FIG. 7 illustrates a flowchart of a method 700 of performing intraoral scanning according to at least one embodiment.

At block 702, a first scan body is positioned at a location of a first implant.

For example, with reference to FIG. 6, a scan body 604-1 is positioned at a location of a first implant.

At block 704, a second scan body is positioned at a location of a second implant.

For example, with reference to FIG. 6, a scan body 604-3 is positioned at a location of a second implant At block 706, a first clip is coupled to the first scan body.

For example, with reference to FIG. 6, a clip 608-1 is coupled to the scan body 604-1.

At block 708, a second clip is coupled to the second scan body.

For example, with reference to FIG. 6, a clip 608-3 is coupled to the scan body 604-3.

The coupled first clip (e.g., clip 608-1) extends from the positioned first scan body (e.g., scan body 604-1) towards the location of the second implant. The coupled second clip (e.g., clip 608-3) extends from the positioned second scan body (e.g., scan body 604-3) towards the location of the first implant.

At block 710, the intraoral scanning may be performed by capturing a plurality of frames.

For example, with reference to FIG. 6, picture frames 606-1, 606-2, 606-3, 606-4, 606-5 are captured.

The coupled first clip and the coupled second clip may serve as recognizable landmarks in a mouth of a person during the intraoral scanning.

A first frame (e.g., picture frame 606-3 of FIG. 6) of the plurality of frames may capture: a portion of the coupled first clip; and a portion of the coupled second clip.

The first frame may capture: at most the portion of the coupled first clip; and at most the portion of the coupled second clip.

At least the first clip or the second clip may have a textured surface. (See, e.g., FIGS. 5A, 5B, 5C, 5D, 5E.)

At least the first clip or the second clip may have a first surface and a second surface elevated relative to the first surface. (See, e.g., FIGS. 5A, 5B, 5C, 5D, 5E.)

The foregoing described embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method of performing intraoral scanning, the method comprising:

positioning a first scan body at a location of a first implant;

positioning a second scan body at a location of a second implant;

coupling a first clip to the first scan body; and coupling a second clip to the second scan body, wherein the coupled first clip extends from the positioned first scan body towards the second clip coupled to the second scan body positioned at the location of the second implant without abutting the second clip, and wherein the coupled second clip extends from the positioned second scan body towards the first clip coupled to the first scan body positioned at the location of the first implant without abutting the first clip.

2. The method of claim 1, further comprising:

performing the intraoral scanning by capturing a plurality of frames.

3. The method of claim 2, wherein the coupled first clip and the coupled second clip serve as recognizable landmarks in a mouth of a person during the intraoral scanning.

4. The method of claim 2, wherein a first frame of the plurality of frames captures:

a portion of the coupled first clip; and a portion of the coupled second clip.

5. The method of claim 4, wherein the first frame captures:

at most the portion of the coupled first clip; and at most the portion of the coupled second clip.

6. The method of claim 1, wherein at least the first clip or the second clip has a textured surface.

7. The method of claim 1, wherein at least the first clip or the second clip has a first surface and a second surface elevated relative to the first surface.

8. A method of performing intraoral scanning, the method comprising:

positioning a first scan body at a location of a first implant;

positioning a second scan body at a location of a second implant;

coupling a first clip to the first scan body; and coupling a second clip to the second scan body, wherein the coupled first clip extends from the positioned first scan body towards the location of the second implant, wherein the coupled second clip extends from the positioned second scan body towards the location of the first implant, and wherein at least the first clip or the second clip has a first surface and a second surface elevated relative to the first surface.

* * * * *